United States Patent [19]
You

[11] Patent Number: 5,904,761
[45] Date of Patent: May 18, 1999

[54] PROCESS FOR PREPARING A PIGMENT FOR A COATED PAPER

[76] Inventor: Kyu Jae You, 48, Nackdong-ri, Nam-myon, Jungsun-kun, Kangwon-do, Rep. of Korea

[21] Appl. No.: 08/950,501

[22] Filed: Oct. 14, 1997

[30] Foreign Application Priority Data

Oct. 16, 1996 [KR] Rep. of Korea ................ 96-46140

[51] Int. Cl.$^6$ ................................................. C09C 1/02
[52] U.S. Cl. ..................... 106/461; 106/419; 106/426; 106/427; 106/431; 423/518; 423/556
[58] Field of Search ............................ 106/464, 465, 106/461, 419, 426, 427, 431; 423/431, 432, 518, 556

[56] References Cited

U.S. PATENT DOCUMENTS

| | | | |
|---|---|---|---|
| 3,347,624 | 10/1967 | Taylor | 423/432 |
| 4,120,697 | 10/1978 | King | 502/172 |
| 4,157,379 | 6/1979 | Arika et al. | 423/432 |

*Primary Examiner*—Michael Marcheschi
*Attorney, Agent, or Firm*—Blakely Sokoloff Taylor & Zafman

[57] ABSTRACT

The present invention provides a method for preparing a needle-shaped pigment with a particle size of 0.3±0.1 μm, which has uniform particle distribution, higher thixotropy, an excellent gloss, and good absorption of printing ink, by continuous addition of aluminum sulfate solution and zinc sulfate solution to a milk of lime.

2 Claims, No Drawings

PROCESS FOR PREPARING A PIGMENT FOR A COATED PAPER

BACKGROUND OF THE INVENTION

The present invention concerns a process for preparing a pigment which is used for a coated paper. More particularly, this invention relates to an improvement of a method for preparing a pigment called 'satin white', which consists essentially of calcium sulfate and aluminum hydroxide.

In manufacturing coated papers, numerous pigment combinations have been employed to improve the productivity and the printability of paper with good sheet gloss at a lower cost.

As a result of the recent increase in the speed of producing paper, and the ongoing need to improve productivity and printability, while reducing cost, there is a need to improve the fluidity of slurry and color (a coating mixture of slurry and adhesive).

Satin white is currently used as a pigment for coated paper because it provides coated paper with an excellent glossy white color and opacity, and improved dryness of printing ink and printability by making the coated surface alkaline. Further, satin white can be treated with calender treatment for an excellent sheet gloss.

U.S. Pat. No. 3,713,881 (T. Akiyama et al.) describes an aqueous coating composition essentially containing water-soluble modified polyvinyl alcohol as a coating binder having one kind, or plural kinds, of substituent groups selected from cyanoethyl, etc.

U.S. Pat. No. 4,952,278 (P. E. Gregory & K. D. Vinson) describes a paper structure having both high opacity and improved tensile strength through the incorporation of extended fiber and an opacifying mineral pigment, such as titanium dioxide.

In U.S. Pat. No. 3,660,131 (M. H. Murray & E. E. Brodhag), satin white coating pigment of improved uniformity, which yields a paper coating having improved physical properties, is prepared by slowly adding an aqueous solution of alum or aluminum sulfate to a stirred aqueous dispersion containing slaked lime or calcium hydroxide and sodium hydroxide.

U.S. Pat. No. 3,798,047 (P. Delfosse) describes a pigment comprising natural calcium carbonate and satin white.

U.S. Pat. No. 3,854,971 (R. F. Conley et al.) describes a method of making a paper coating pigment by forming a satin white in aqueous suspension, adding thereto a kaolinite, and removing a major portion of water from the aqueous suspension to form a free flowing powder.

U.S. Pat. No. 4,241,143 (Y. Ashie & Y. Nakamura) describes a cast coated paper produced by applying an aqueous coating color, which contains satin white, and a polymer latex having a Tg.

U.S. Pat. No. 5,030,325 (S. Saji et al.) describes a method of manufacturing gloss coated paper by applying a coating, composition, whose pigment contains satin white and an organic pigment, and adhesive on base paper.

In the prior art, two kinds of satin white have been known, i.e. a large pillar-shaped particle with 2~10 $\mu$m of mean particle size, and a smaller needle-shaped particle with 0.1~2.0 $\mu$m of mean particle size. The former can be obtained by batch-type addition of aluminum sulfate ($Al_2(SO_4)_3$) to an aqueous suspension of calcium hydroxide (a milk of lime), and the latter by continuous addition of aluminum sulfate thereto.

Though both kinds of particles show excellent whiteness and printing gloss compared to other pigments, it has been found that a slurry of the pillar-shaped particle in high concentration is not suitable for a high speed coating process, as it is dilatant due to its large particle size. However, the needle-shaped particles in the form of color in high concentration can be used in a high speed coating process due to its superior fluidity.

Nowadays, a more improved satin white pigment which provides more uniform particle distribution, improved thixotropy, and excellent printability is required.

SUMMARY OF THE INVENTION

An object of the present invention is to provide a pigment for a coated paper with excellent fluidity, which can give improved particle distribution, gloss, and printability onto the coated surface.

DETAILED DESCRIPTION OF PREFERRED EMBODIMENTS

The major difference between the present invention and the continuous method for producing the satin white of 0.1~2.0 $\mu$m in the prior art lies in using Zn in addition to Ca and Al as cations. Therefore, needle-shaped crystals are produced easily and in a stable manner by the instantaneous reaction of aluminum sulfate and zinc sulfate with a milk of lime.

The crystal habit similar to the above was described in Korean Patent Application No. 96-2535 (Process for producing ultrafine particles of colloidal calcium carbonate) filed by the applicant of the present invention.

According to the present invention, a milk of lime is made to flow through a pipe into a mixing agitator with high speed and shearing stress, such as a pipeline homomixer, while aluminum sulfate and zinc sulfate are continuously mixed and made to flow through another pipe with pressure into the agitator. A reaction between the reactants is completed instantaneously, and a pigment which includes a compound of calcium aluminum sulfate and zinc aluminum sulfate with particle size of 0.3±0.1 $\mu$m and uniform particle distribution is produced.

The four essential conditions for the needle-shaped particles of 0.3±0.1 $\mu$m are as follows:

1) The concentration and temperature of the milk of lime, aluminum sulfate and zinc sulfate are 7±2% by weight, and 40±5° C., respectively (hereinafter, % by weight of aluminum sulfate is described on the basis of $Al_2O_3$);

2) The molar ratio of ZnO/CaO is 0.04~0.25/1;

3) The molar ratio of CaO+ZnO/$Al_2O_3$ is 7±0.5/1; and

4) Aluminum sulfate and zinc sulfate are continuously added and mixed with the milk of lime.

A pigment slurry is obtained by an aging treatment at 60±3° C. for 5±3 hours. The slurry obtained therefrom is dehydrated by centrifugal separator, and mixed and stirred with an acrylic acid dispersant. The resulting pigment slurry shows a low viscosity. A coating agent for a coated paper, called "color", is finally produced by adding a kaolinite pigment or adhesive to the slurry.

The present invention will now be described in more detail, with reference to the following illustrative Examples.

EXAMPLE 1

8% by weight of a milk of lime was prepared at 40° C. Aluminum sulfate solution (8% by weight based on $Al_2O_3$) with molar ratio of 7.0/1 for CaO+ZnO/$Al_2O_3$, and zinc sulfate solution (8% by weight) with molar ratio of 0.05/1 for ZnO/CaO, were prepared at the same temperature. The milk of lime was made to flow into a pipe, and the aluminum sulfate solution and the zinc sulfate solution were mixed together and added to the milk of lime in the pipe with pressure. The mixture was agitated in the pipeline, and transferred to another tank for maturation. It was treated at 60° C. for 5 hours.

After the treatment, the mixture was dehydrated by a centrifugal separator, resulting in a cake including 31% by weight of solid material. 0.5% by weight (based on solid material of pigment) of polyacrylic soda was added to the cake, and a pigment with 0.3 μm of mean particle diameter was obtained.

EXAMPLES 2 AND 3, AND COMPARATIVE EXAMPLES 1 TO 6

Conditions and results for the reactions are shown in Table 1.

'excellent', 'good', and 'bad' respectively. In addition, Δ represents a state between the good and bad states.

It should be noted that the uniformity of particles is better with smaller distribution width of particles. Also, the fluidity is better with higher thixotropy, and the printability with a smaller value of ink sets.

The advantages of the pigment produced by means of the present invention include:

1. highly glossy whiteness on a coated paper, e.g., an art paper,
2. good opacity and printability,
3. providing paper of high quality at a low cost.

TABLE 1

| | case | | | | | | | | |
|---|---|---|---|---|---|---|---|---|---|
| | EXAMPLES | | | COMPARATIVE EXAMPLES | | | | | |
| condition | 1 | 2 | 3 | 1 | 2 | 3 | 4 | 5 | 6 |
| Milk of lime Aluminum sulfate Zinc sulfate | | | | | | | | | |
| % | 8 | 8 | 8 | 4 | 10 | 8 | 8 | 8 | 8 |
| ° C. | 40 | 40 | 40 | 40 | 40 | 40 | 40 | 40 | 40 |
| ZnO/CaO (molar ratio) | 0.05 | 0.20 | 0.05 | 0.05 | 0.05 | 0.02 | 0.40 | 0.05 | 0.05 |
| CaO + ZnO/Al$_2$O$_3$ (molar ratio) | 7.0 | 7.0 | 6.8 | 7.0 | 7.0 | 7.0 | 7.0 | 8.0 | 7.0 |
| Aging condition (° C., hr) | 60, 5 | 60, 5 | 60, 5 | 60, 5 | 60, 5 | 60, 5 | 60, 5 | 60, 5 | 60, 5 |
| Reaction type | continuous | continuous | continuous | continuous | continuous | continuous | continuous | continuous | batch type |
| RESULTS | | | | | | | | | |
| Solid material (%) | 31 | 31.5 | 31 | 27 | 28 | 25 | 26 | 24 | 22 |
| Particle size (μm) | 0.30 | 0.25 | 0.28 | 0.50 | 0.60 | 0.80 | 0.80 | 1.00 | 1.50 |
| Uniformity | ⊙ | ⊙ | ○ | Δ | Δ | Δ | Δ | x | x |
| Fluidity | ⊙ | ⊙ | ⊙ | Δ | Δ | Δ | Δ | x | x |
| Gloss | ⊙ | ⊙ | ⊙ | Δ | Δ | Δ | Δ | x | x |
| Printability | ⊙ | ⊙ | ○ | Δ | Δ | Δ | Δ | Δ | x |

APPLICATION EXAMPLE

3% by weight (based on solid material of pigment) of polyacrylic soda was added as a dispersant to the pigments of Examples 1 to 3 and those of Comparative Examples 1 to 6. 24% by weight of a pigment slurry for a coated paper was obtained from the mixtures.

The fluidity of slurries was measured by Hercules high shear viscometer. Colors with the following ratio were manually applied onto surface of paper of high quality with a coating bar, dried at room temperature, and subjected to super calender treatment.

| Mixing Ratio of Color | |
|---|---|
| pigment | 80% by weight |
| starch (adhesive) | 10% by weight |
| Latex (adhesive) | 10% by weight |
| solid material | 50% by weight |

Evaluation for Examples and Comparative Examples are shown on the following table. ⊙, ○, and X represent

I claim:

1. A process for preparing needle-shaped pigment with a mean particle size of 0.3±0.1 μm for a coated paper comprising the steps of:
   (a) continuously admixing an aqueous solution of aluminum sulfate, an aqueous solution of zinc sulfate and an aqueous suspension of calcium hydroxide, wherein each individual solution and suspension has a concentration of 7±2% by weight and a temperature of 40±5° C., wherein the concentration of aluminum sulphate is based on Al$_2$O$_3$, and the amounts of the solutions and the suspension are controlled such that the molar ratios of ZnO to CaO, and ZnO and CaO to Al$_2$O$_3$, are in the range of 0.04 to 0.25/1 and 7±0.5/1, respectively; and
   (b) aging the resultant suspension.

2. A process according to claim 1, the process further comprising dehydrating the aged suspension to prepare a cake, adding polyacrylic acid to the cake, and subjecting the cake to drying and pulverizing to obtain a dry product.

* * * * *

UNITED STATES PATENT AND TRADEMARK OFFICE
CERTIFICATE OF CORRECTION

PATENT NO. : 5,904,761
DATED : May 18, 1999
INVENTOR(S) : You

It is certified that error appears in the above-identified patent and that said Letters Patent is hereby corrected as shown below:

On the Title Page
In [56], line 4, delete "4,120,697  10/1978" and insert -- 5,120,697  6/1992 --.

Signed and Sealed this

Twenty-fourth Day of April, 2001

*Attest:*

NICHOLAS P. GODICI

*Attesting Officer*     *Acting Director of the United States Patent and Trademark Office*